US009120412B2

(12) United States Patent
Cantor et al.

(10) Patent No.: US 9,120,412 B2
(45) Date of Patent: Sep. 1, 2015

(54) CARRYING AUTONOMOUS VEHICLE SYSTEM AND METHODS

(71) Applicant: Robo-Team Ltd., Tel-Aviv (IL)

(72) Inventors: Daniel Cantor, Tel-Aviv (IL); Yehonatan Asher, Tel-Aviv (IL); Mor Rotbart, Givataim (IL); Mark Vaynberg, Rishon-LeZion (IL); Yosi Wolf, Tel-Aviv (IL); Elad Levy, Tel-Aviv (IL)

(73) Assignee: Robo-Team Ltd., Tel-Aviv (IL)

( * ) Notice: Subject to any disclaimer, the term of this patent is extended or adjusted under 35 U.S.C. 154(b) by 131 days.

(21) Appl. No.: 13/867,138

(22) Filed: Apr. 22, 2013

(65) Prior Publication Data

US 2013/0338825 A1 Dec. 19, 2013

Related U.S. Application Data

(60) Provisional application No. 61/659,004, filed on Jun. 13, 2012.

(51) Int. Cl.
| | |
|---|---|
| *B60P 1/00* | (2006.01) |
| *B25J 9/00* | (2006.01) |
| *B62D 55/02* | (2006.01) |
| *B62D 55/065* | (2006.01) |
| *B62D 55/075* | (2006.01) |
| *B62D 57/02* | (2006.01) |
| *B25J 5/00* | (2006.01) |

(52) U.S. Cl.
CPC .. *B60P 1/00* (2013.01); *B25J 5/005* (2013.01); *B25J 9/00* (2013.01); *B62D 55/02* (2013.01); *B62D 55/065* (2013.01); *B62D 55/075* (2013.01); *B62D 57/022* (2013.01)

(58) Field of Classification Search
CPC ... B60P 3/122; B60P 3/07–3/08; B60P 1/433; B60P 3/062; B60P 1/025; B60P 1/43; B60P 1/6454; B60P 3/06; B60P 7/13; B60P 7/08; B60P 1/4428; B60P 1/48; B60P 1/5433; B60P 1/5495; B60P 3/073; B60P 1/00; B62D 55/075; B62D 55/065; B62D 57/024; B62D 55/0655; B62D 57/02; B62D 55/10; B62D 55/116; B62D 55/02; Y10S 901/01; Y10S 280/901; G05D 2201/0216; B25J 9/00
See application file for complete search history.

(56) References Cited

U.S. PATENT DOCUMENTS

| | | | | | |
|---|---|---|---|---|---|
| 5,722,810 | A | * | 3/1998 | Young et al. | 414/563 |
| 5,853,280 | A | * | 12/1998 | Lohr | 414/482 |
| 6,315,515 | B1 | * | 11/2001 | Young et al. | 414/563 |
| 6,447,237 | B1 | * | 9/2002 | Haynes | 414/483 |
| 6,742,790 | B2 | * | 6/2004 | Seagraves et al. | 280/47.34 |
| 7,210,890 | B2 | * | 5/2007 | Curotto et al. | 414/408 |
| 7,648,320 | B2 | * | 1/2010 | Valli | 414/254 |

(Continued)

OTHER PUBLICATIONS

TransportTeamOfRobots.pdf (Esra Kadioglu, Nikolaos Papanikolopoulos, A Method for Transporting a Team of Miniature Robots, Oct. 2003, IEEURSJ, Proceedings of the 2003 IEEURSJ, pp. 2297-3302).*

*Primary Examiner* — Bao Long T Nguyen

(57) ABSTRACT

A carrying autonomous vehicle system, comprising: a carrying autonomous vehicle and at least one carried autonomous vehicle. The carrying autonomous vehicle has a main frame and at least one flipper. The carried autonomous vehicle uses at least one flipper to load and/or unload at least one carried autonomous vehicle on the main frame.

11 Claims, 11 Drawing Sheets

(56) References Cited

U.S. PATENT DOCUMENTS

| | | | |
|---|---|---|---|
| 7,673,889 B2* | 3/2010 | Wells et al. | 280/79.11 |
| 7,740,438 B2* | 6/2010 | Xiang et al. | 414/256 |
| 8,007,221 B1* | 8/2011 | More et al. | 414/680 |
| 8,849,494 B1* | 9/2014 | Herbach et al. | 701/24 |
| 2003/0049091 A1* | 3/2003 | Widdowson | 410/143 |
| 2005/0000738 A1* | 1/2005 | Gehring et al. | 180/14.1 |
| 2005/0114005 A1* | 5/2005 | Gehring et al. | 701/70 |
| 2008/0179115 A1* | 7/2008 | Ohm et al. | 180/9.21 |
| 2008/0183332 A1* | 7/2008 | Ohm et al. | 700/250 |
| 2009/0145671 A1* | 6/2009 | Filippov et al. | 180/9.42 |
| 2011/0231014 A1* | 9/2011 | Krajewski et al. | 700/245 |
| 2012/0183382 A1* | 7/2012 | Couture et al. | 414/547 |
| 2012/0189422 A1* | 7/2012 | Learned | 414/809 |

\* cited by examiner

CARRYING AUTONOMOUS VEHICLE SYSTEM AND METHODS

RELATED APPLICATION

This application claims the benefit of priority under 35 USC §119(e) of U.S. Provisional Patent Application No. 61/659,004 filed Jun. 13, 2012, the contents of which are incorporated herein by reference in their entirety.

FIELD AND BACKGROUND OF THE INVENTION

The present invention, in some embodiments thereof, relates to a carrying autonomous vehicle system and methods and, more particularly, but not exclusively, to a carrying autonomous vehicle system capable of loading and/or unloading at least one carried autonomous vehicle.

Hazardous or hostile conditions have led to a need to minimize or restrict human presence in the hazardous environment. Mobile robots can be used in a first response to environments containing hazardous chemicals, radioactive substances, unexploded ordnance, and other hazards; in hostile adversary situations such as special forces operations, security force responses, bomb neutralizing, search and rescue operations, and adversary surveillance and monitoring; and in accident scenarios in industries such as mining to serve as a quick-response hazards sensor in synergy with an observation platform.

When the hazardous environment also imposes requirements for high mobility or obstacle climbing, as well as a need to overcome communication range limitations and communication blackout situations, robotic control systems need to provide an operator with versatile communications and video options for new generations of mobile robots.

Vehicles in mobile robot systems come in varying sizes, from small miniature robotic vehicles (for example, vehicles substantially the size of a paperback book), to approximately ⅓-meter long vehicle platforms, to mid-sized 1-meter long platform robotic vehicles, to even human-carrier-sized robotic vehicles. An example wheeled robotic vehicle is a RATLER™, like those developed by Sandia National Laboratories. A robotic vehicle system generally has a robotic vehicle and a system for controlling the robotic vehicle.

SUMMARY OF THE INVENTION

According to an aspect of some embodiments of the present invention there is provided a carrying autonomous vehicle system, comprising: a carrying autonomous vehicle having a main frame and at least one flipper; and at least one carried autonomous vehicle; wherein the at least one carried autonomous vehicle uses the at least one flipper to at least one of load and unload the at least one carried autonomous vehicle on the main frame.

Optionally, the main frame has an essentially flat top part. Optionally, the at least one carried autonomous vehicle comprises a plurality of carried autonomous vehicles and the total accumulated area of the plurality of carried autonomous vehicles is essentially the same as the area of the main frame. Optionally, the carrying autonomous vehicle coordinates the at least one carried autonomous vehicle use of the at least one flipper to at least one of load and unload the at least one carried autonomous vehicle on the main frame. Optionally, the at least one flipper movement range and position allow the main frame to be angled towards the at least one carried autonomous vehicle thereby allowing the at least one flipper to at least one of load and unload. Optionally, the at least one carried autonomous vehicle has a pair of carried flippers and the at least one flipper comprises a pair of flippers and the distance between the pair of flippers is essentially the same as the distance between the pair of carried flippers. Optionally the carrying autonomous vehicle system further comprises: a locking mechanism mounted on the at least one flipper; and a locking receiving mechanism on at least one carried autonomous vehicle; wherein the locking mechanism locks into the locking receiving mechanism thereby allowing attachment of at least one carried autonomous vehicle to the at least one flipper.

According to some embodiments of the invention, there is provided a method for loading a carrying autonomous vehicle system, carrying an autonomous vehicle, comprising: navigating a carried autonomous vehicle to a proximity of a carrying autonomous vehicle; instructing the maneuvering of at least one flipper of the carrying autonomous vehicle to a loading angle; and navigating the carried autonomous vehicle to climb the carrying autonomous vehicle in a loading angle.

According to some embodiments of the invention, there is provided a method for at least one of loading and unloading a carried autonomous vehicle of a carrying autonomous vehicle system comprising: positioning a carried autonomous vehicle and a carrying autonomous vehicle so the carried autonomous vehicle's pair of carried flippers is essentially in front of the carrying autonomous vehicle system's pair of flippers; and driving the pair of carried flippers on top of the pair of flippers.

According to some embodiments of the invention, there is provided a method for loading a carried autonomous vehicle on a carrying autonomous vehicle system comprising: instructing a carried autonomous vehicle and a carrying autonomous vehicle system having at least one flipper to a close proximity; securing a locking mechanism of the at least one flipper to a locking receiving mechanism of the carried autonomous vehicle; lifting the at least one flipper; and mounting the carried autonomous vehicle on top of the carrying autonomous vehicle system using the carried autonomous vehicle lifted position obtained by the at least one flipper.

Optionally, method for loading a carried autonomous vehicle on a carrying autonomous vehicle system the further comprises releasing the locking mechanism thereby allowing loading multiple then carried autonomous vehicles by the same the at least one flipper.

According to some embodiments of the invention, there is provided a multi robot system, comprising: an autonomous vehicle; an autonomous robot having an end effector; and a controlling mechanism which coordinates manipulation of an external object by the end effector when the autonomous robot is mounted on the autonomous vehicle.

Optionally, the autonomous robot has a sensor and the autonomous robot has a carried state on top of the autonomous vehicle and a non carried state as an autonomous vehicle and the sensor's capability to at least one of gathering and transmitting data is greater in carried state compared to un-carried state.

According to some embodiments of the invention, there is provided a vehicle system, comprising: a main frame; a flipper axle mounted on the main frame; at least one triangular obstacle climbing flipper rotatably connected to the flipper axle, having a moving mechanism and a bottom side; and at least one mobilizing wheel mounted on the main frame; wherein the distance between the flipper axle and the bottom side is greater than the radius of the at least at least one mobilizing wheel.

Optionally, the moving mechanism is a continuous track. Optionally, the at least one mobilizing wheel rotates around the flipper axle. Optionally the system of further comprises a powering element wherein the powering element powers the at least one triangular obstacle climbing flipper and the powering element powers the at least one mobilizing wheel. Optionally, the at least one mobilizing wheel is laterally mounted on the main frame. Optionally the system further comprises a reversible locking mechanism wherein the at least one mobilizing wheel is released by the reversible locking mechanism and the at least one mobilizing wheel is remounted on main frame by the reversible locking mechanism.

According to some embodiments of the invention, there is provided a method, comprising: lowering at least one triangular obstacle climbing flipper thereby lifting at least one mobilizing wheel; and switching from a driving mechanism based on at least one mobilizing wheel to a driving mechanism based on at least one triangular obstacle climbing flipper.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to a carrying autonomous vehicle system and methods and, more particularly, but not exclusively, to a carrying autonomous vehicle system capable of loading and/or unloading at least one carried autonomous vehicle.

Figure 1:
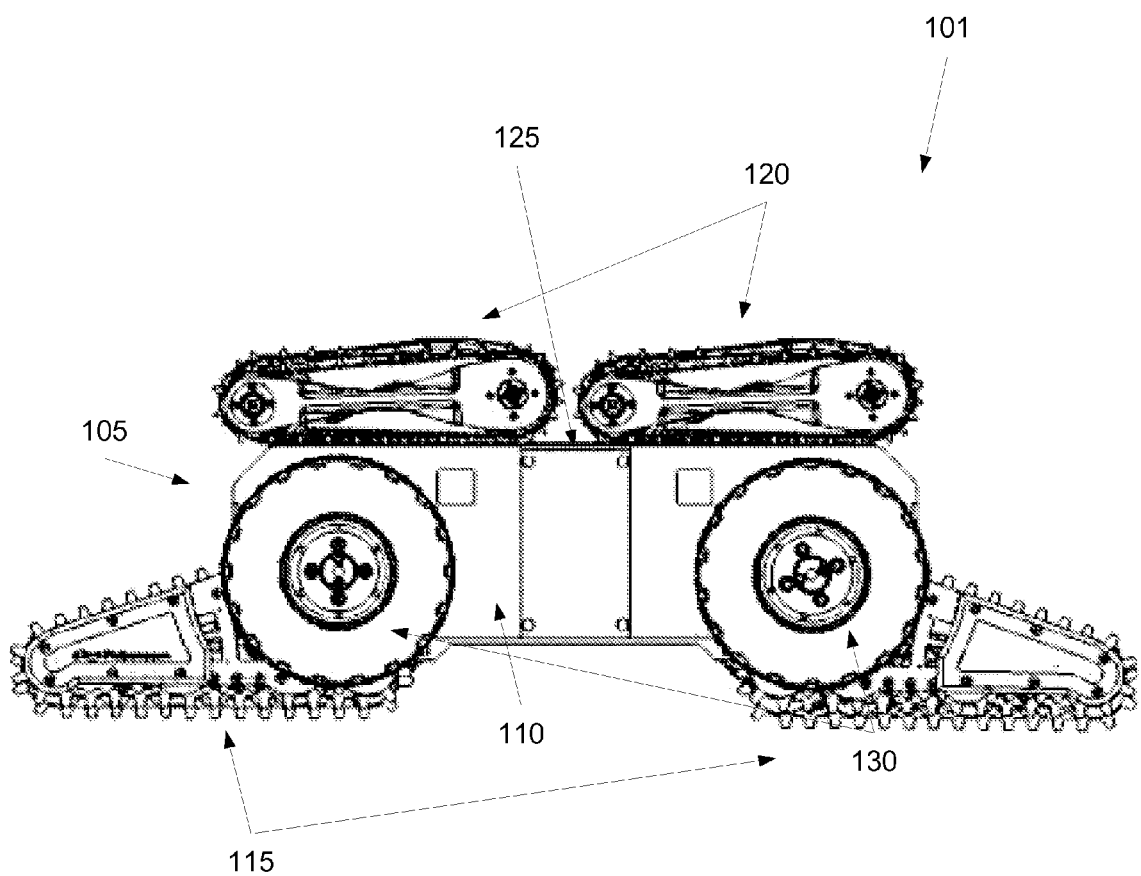
FIG. 1 is a schematic illustration of a carrying autonomous vehicle system with two carried autonomous vehicles, according to some embodiments of the present invention.

Referring now to the drawings, FIG. 1 illustrates a schematic view of a carrying autonomous vehicle system 101 with two carried autonomous vehicles 120, according to some embodiment of the present invention. The carrying autonomous vehicle system 101 comprises a carrying autonomous vehicle 105 having a main frame 110 and at least one flipper 115. For example, the carrying autonomous vehicle 105 has four flippers: front right, front left, rear right and rear left. The main frame 110 has an essentially flat top part. The top part 125 may enable carrying an autonomous vehicle 105. Optionally, the carried autonomous vehicle 120 fits into a groove in the top part 125 of the main frame 110, to secure it while in the carrying autonomous vehicle system 101 is in motion. Securing of the carried autonomous vehicle 120 may be performed by belts, knobs and holes, fasteners, magnets and/or other securing means. Optionally, when there is a plurality of carried autonomous vehicles 120, the total accumulated area of the plurality of carried autonomous vehicles 120 is essentially the same as the area of the main frame 110. For example, a carrying autonomous vehicle 105 having a 330 cm width and a 950 cm length, may carry two carried autonomous vehicles 120 having a 330 cm width and a 450 cm length each. The carrying autonomous vehicle 105 carries at least one carried autonomous vehicle 120. Optionally, the carried autonomous vehicle 120 is a robot, having at least one end effector for manipulating external objects. The carried autonomous vehicle 120 uses the flipper 115 to load and/or unload the carried autonomous vehicle 120 on the main frame 115. Loading and unloading may be performed by the carried autonomous vehicle 120 driving over the flippers 115 of the carrying autonomous vehicle 105. Loading and unloading may be performed by locking the carried autonomous vehicle 120 to the flippers 115 and lifting and/or lowering the flippers to enable the carried autonomous vehicle 120 repositioning to the main frame 110. Loading and unloading may be performed by grasping the carried autonomous vehicle 120 between a pair of flippers 115, and moving the pair of flippers together to load/unload the carried autonomous vehicle 120. The carrying autonomous vehicle 105 and the carried autonomous vehicle 120 may coordinate to achieve loading and/or unloading. The coordination may be manually guided by an operator controlling one or more of the carrying 105 and/or carried 120 autonomous vehicles. Optionally, the carrying autonomous vehicle 105 coordinates the carried autonomous vehicle 120 use of the flipper 115 to load and/or unload the carried autonomous vehicle 120 on the main frame 110. The carrying autonomous vehicle 105 and the carried autonomous vehicle 120 may communicate to achieve the coordination. The carrying autonomous vehicle 105 may have a leader role and provide the carried autonomous vehicle 120 instructions to achieve loading and/or unloading. Optionally, the carried autonomous vehicle 120 performs a predefined set of instructions upon loading and/or unloading command. The command may be supplied by a human operator, by the carrying autonomous vehicle 105 and/or triggered by a set of external and internal conditions, for example: visibility, noise, location, mission status, battery charging status, mobilizing wheel's 130 air pressure, communication signal, location of other carried autonomous vehicle 120 and/or time. Optionally, the carried autonomous vehicle 120 may react to the movements of the carrying autonomous vehicle 105 in a predefined way.

Figure 2:
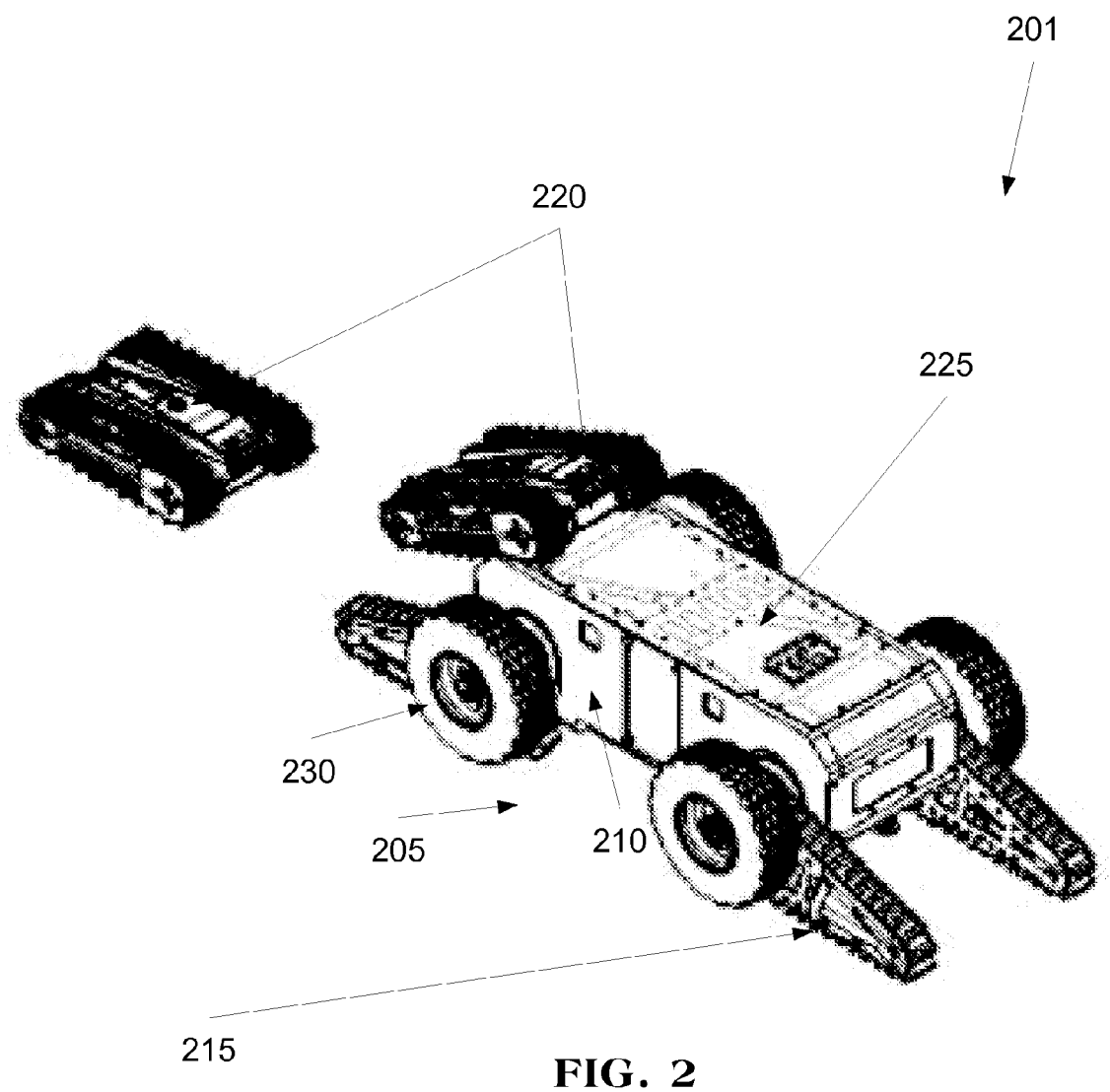
FIG. 2 is a schematic rear view 3D illustration of a carrying autonomous vehicle system unloading two carried autonomous vehicles, according to some embodiments of the present invention.

Reference is now made to FIG. 2, which illustrates a 3D schematic rear view of a carrying autonomous vehicle system 201 unloading two carried autonomous vehicles 220, according to some embodiment of the present invention. In this embodiment the carrying autonomous vehicle system 201 has two flippers 215. The flippers' 215 movement range and position allow the main frame 210 to be angled towards the carried autonomous vehicle 220 thereby allowing the flippers 215 to load and/or unload the carried autonomous vehicle 220. The angle towards the carried autonomous vehicle 220 may bring the main frame 210 close to ground level without touching the ground. The towards the carried autonomous vehicle 220 may enable the carried autonomous vehicle 220 to climb onto the main frame 210 like it would climb other obstacles in a rough terrain, optionally using the carried autonomous vehicle 220 flippers, mobilizing wheels and/or driving mechanism. Optionally, after unloading and/or unloading one carried autonomous vehicle 220 from the main frame 210 another carried autonomous vehicle 220 is loaded and/or unloaded iteratively.

Figure 3:
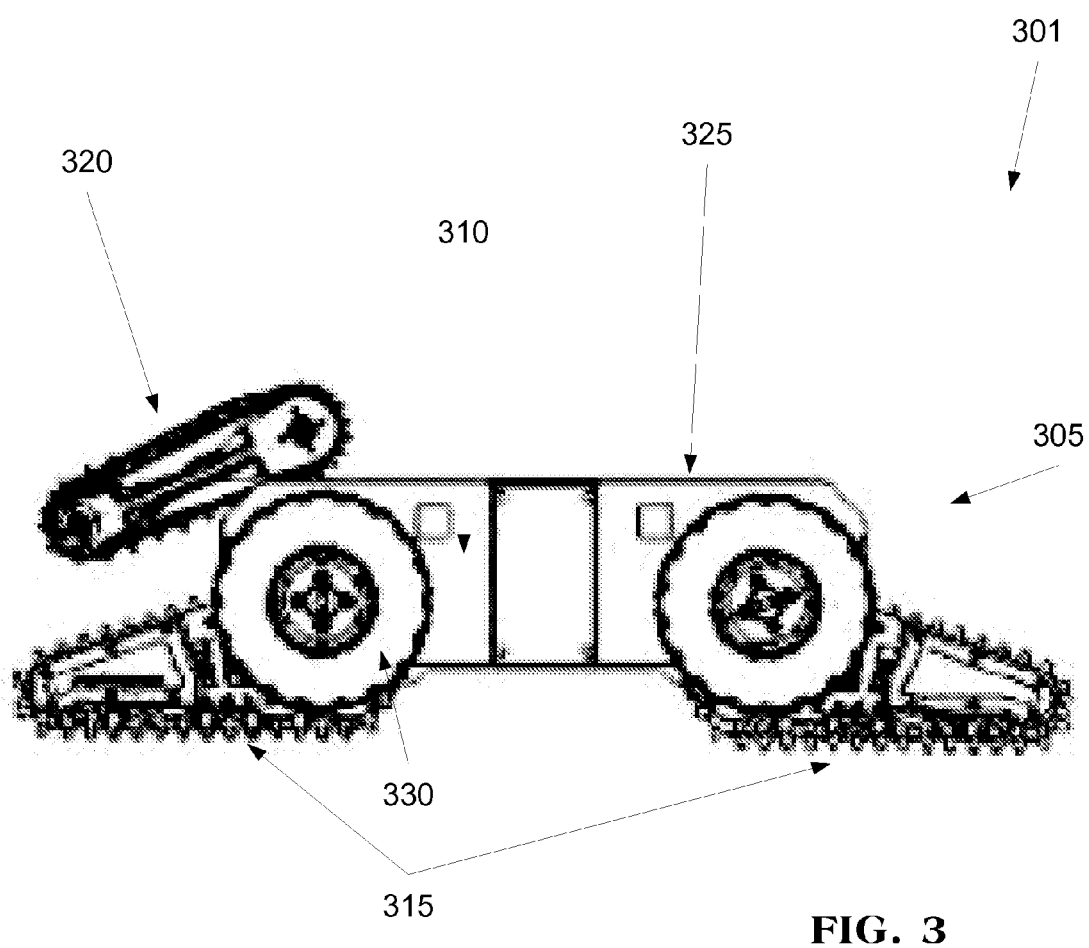
FIG. 3 is a schematic side view illustration of a carrying autonomous vehicle system unloading two carried autonomous vehicles, according to some embodiments of the present invention.

Reference is now made to FIG. 3, which illustrates a schematic side view of a carrying autonomous vehicle system 301 unloading two carried autonomous vehicles 320, according to some embodiment of the present invention. The carrying autonomous vehicle system 301 is as described in FIG. 2.

Figure 4:
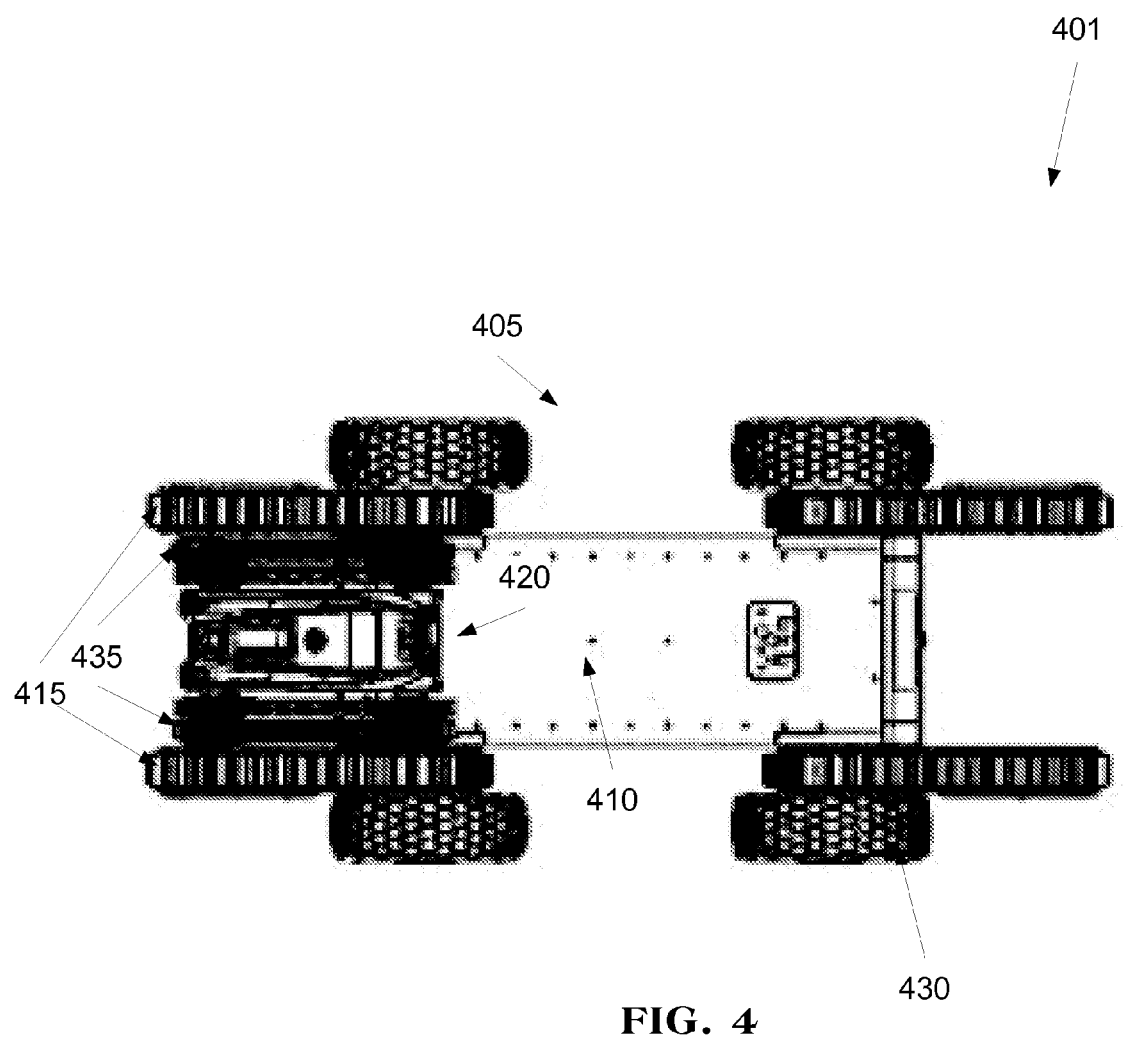
FIG. 4 is a schematic bottom view illustration of a carrying autonomous vehicle system with a carried autonomous vehicle between its flippers, according to some embodiments of the present invention.

Reference is now made to FIG. 4, which illustrates a schematic top view of a carrying autonomous vehicle system 401 with a carried autonomous vehicle 420 between its flippers 415, according to some embodiment of the present invention. A locking mechanism is mounted on the flipper 415. The locking mechanism may be based on a pin-tumbler mechanism, a wafer-tumbler mechanism, a magnetic field, an eccentric cam lock and/or other fasteners types. A locking receiving mechanism is found on the carried autonomous vehicle 420. The locking mechanism locks into the locking receiving mechanism thereby allowing attachment of at least one carried autonomous vehicle 410 to at least one flipper 415. Optionally, the autonomous vehicle 410 attaches via the locking mechanism and the locking receiving mechanism to a single flipper 415. Optionally, the carried autonomous vehicle 420 has a pair of carried flippers 435. The carried autonomous vehicle 420 may fit in between the flippers 415. The distance between the carried autonomous vehicle 420 lateral sides may be essentially the same as the distance the inner part of the flippers 415. Optionally, the distance between the carrying autonomous vehicle's 405 pair of flippers 415 is essentially the same as the distance between the pair of carried flippers 435. The pair of flippers 415 may move in coordination while locked to the carried autonomous vehicle 420.

Figure 5:
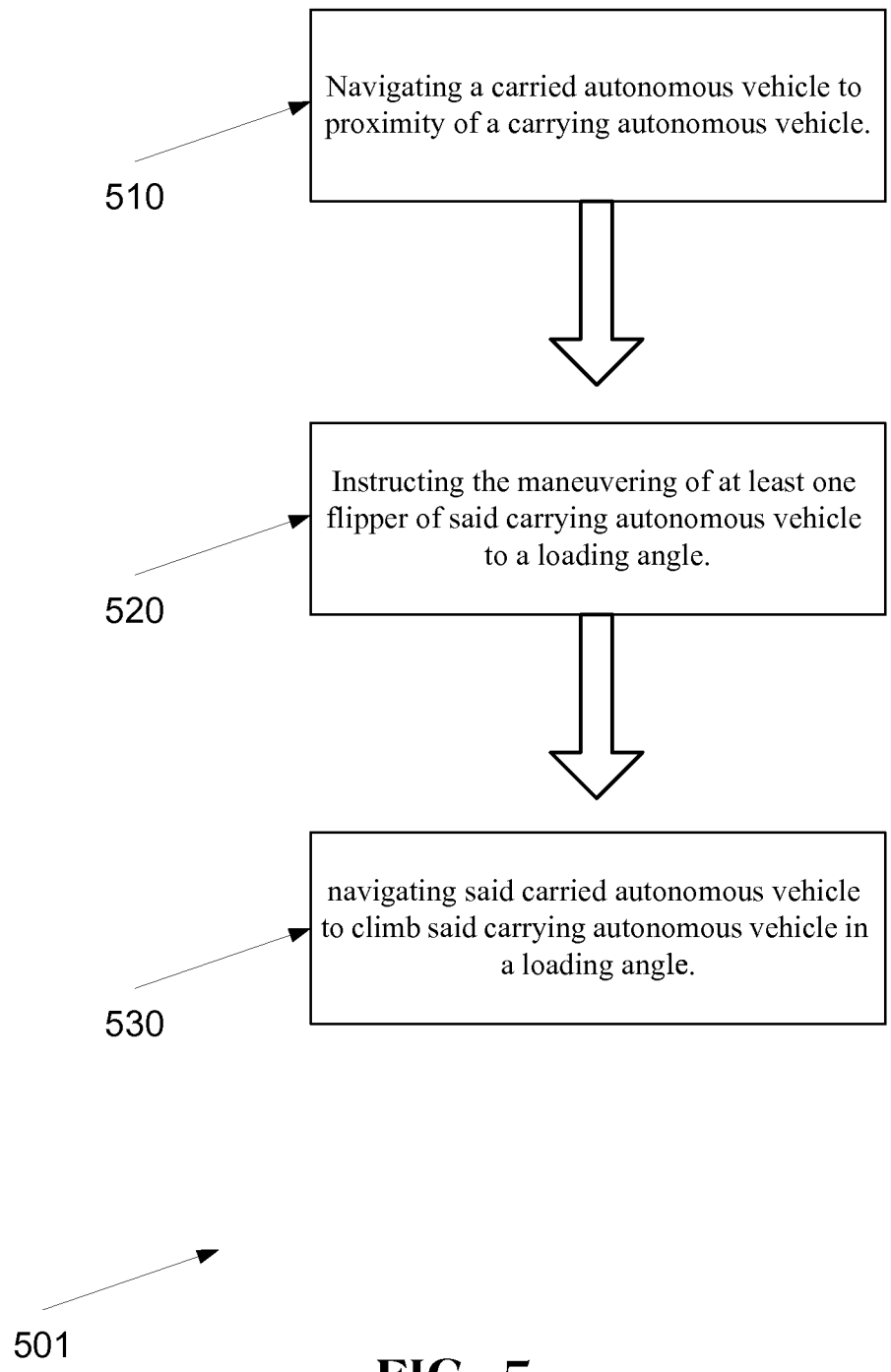
FIG. 5 is a schematic illustration of a process for loading a carrying autonomous vehicle system carrying an autonomous vehicle, according to some embodiments of the present invention.

Reference is now made to FIG. 5, which is a schematic illustration of the process for loading a carrying autonomous vehicle system carrying an autonomous vehicle, according to some embodiment of the present invention. First, a carried autonomous vehicle is navigated to proximity of a carrying autonomous vehicle. The navigation may be, for example, directed by a human operator, a predefined set of maneuvers triggered on command, led by the carrying autonomous vehicle system using communication with the carrying an autonomous vehicle and/or a combination thereof. A human operator may be in physical proximity and/or may control the carrying autonomous vehicle system using display and communication means from a distance. Next, the maneuvering of at least one flipper of the carrying autonomous vehicle is instructed to a loading angle. The loading angle of the flipper may be chosen such as to lower the carrying autonomous vehicle to enable the next step which included climbing over the carrying autonomous vehicle. Finally, the carried autonomous vehicle is navigated to climb the carrying autonomous vehicle in a loading angle. Climbing may occur, for example, by driving directly onto the top part of the carrying autonomous vehicle like a ramp, driving onto the top part of the carrying autonomous vehicle while bridging over gaps, driving over a flipper, grasping onto a flipper and lifting the flipper and/or a combination thereof.

Figure 6:
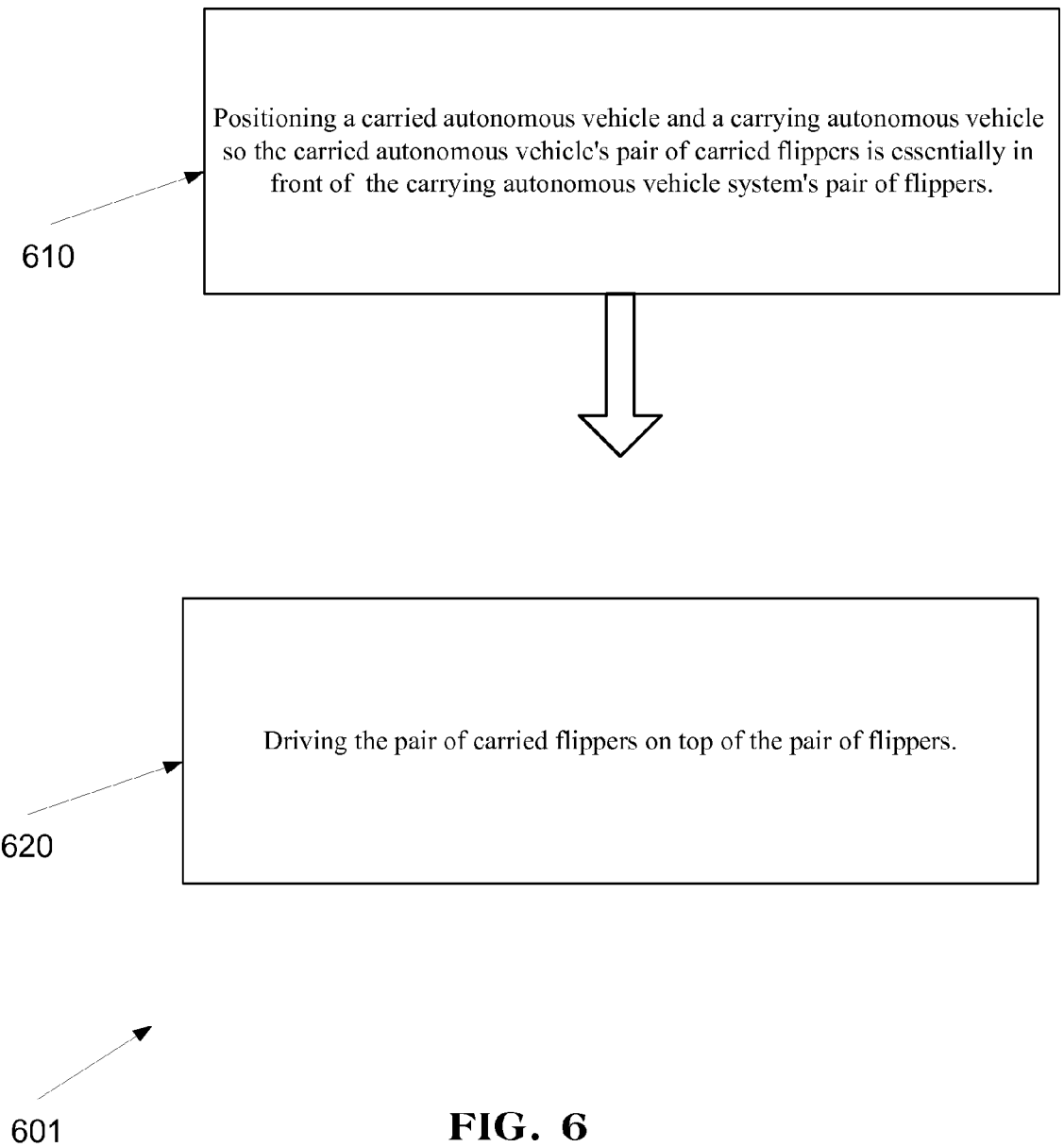
FIG. 6 is a schematic illustration of a process for at least one of loading and unloading a carried autonomous vehicle of a carrying autonomous vehicle system, according to some embodiments of the present invention.

Reference is now made to FIG. 6, which is a schematic illustration of the process for at least one of loading and unloading a carried autonomous vehicle of a carrying autonomous vehicle system, according to some embodiment of the present invention. First a carried autonomous vehicle and a carrying autonomous vehicle are positioned so the carried autonomous vehicle's pair of carried flippers is essentially in front of the carrying autonomous vehicle system's pair of flippers. The positioning may occur by moving only the carried autonomous vehicle, by moving only the carrying autonomous vehicle, by moving both vehicles and/or a combination thereof. Next, the pair of carried flippers drives on top of the pair of flippers.

Figure 7:
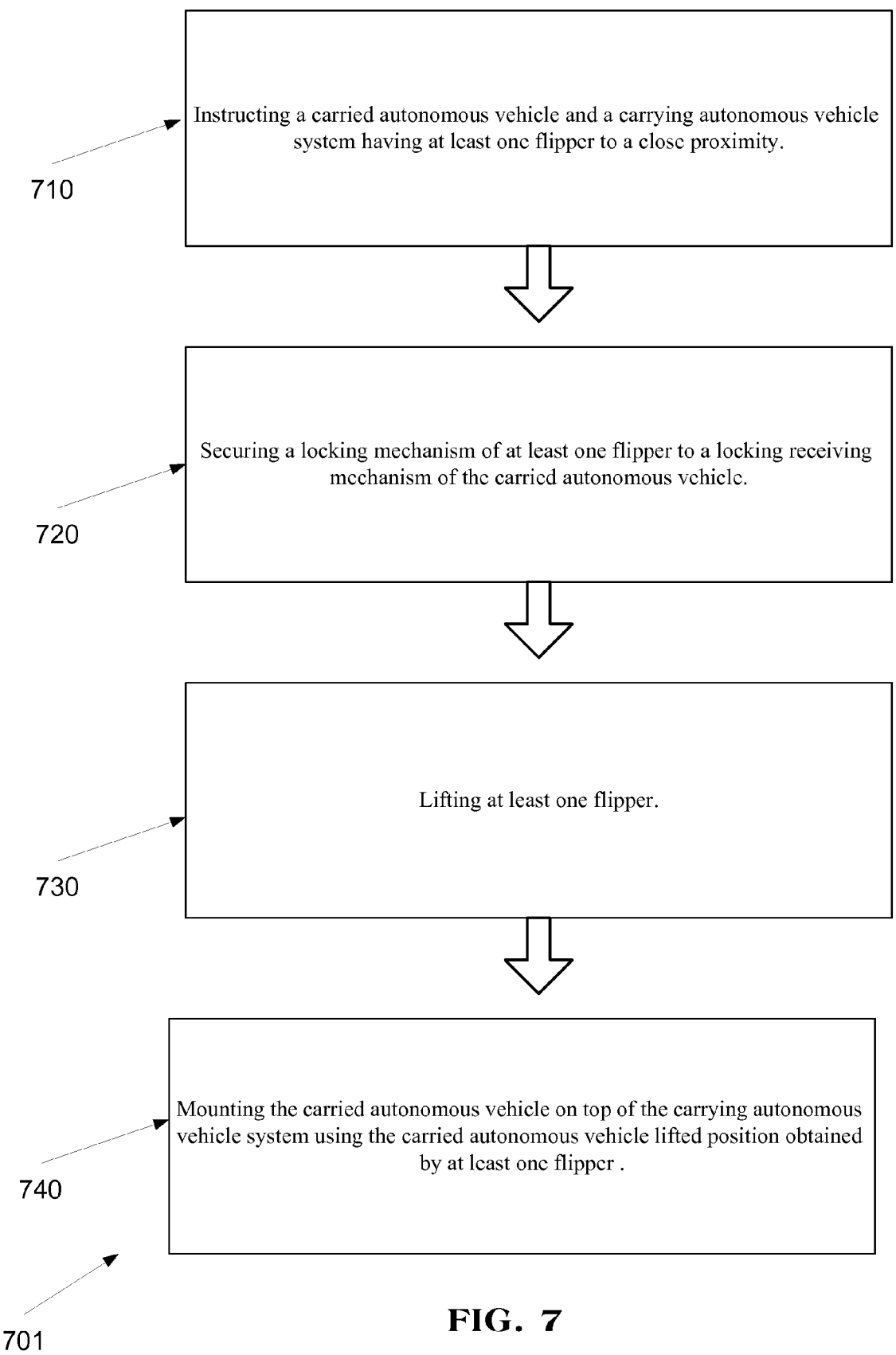
FIG. 7 is a schematic illustration of a process for loading a carried autonomous vehicle on a carrying autonomous vehicle system, according to some embodiments of the present invention.

Reference is now made to FIG. 7, which is a schematic illustration of the process for loading a carried autonomous vehicle on a carrying autonomous vehicle system, according to some embodiment of the present invention. First, a carried autonomous vehicle and a carrying autonomous vehicle system having at least one flipper are instructed to a close proximity. Optionally, communication between the carried autonomous vehicle and the carrying autonomous vehicle system assists the process of instructing the vehicles to a close proximity. The communication may be two ways between the carrying and carried vehicles. Instructions in a two ways communication may be provided by one or both of the carrying and the carried vehicles. The communication may be one way, for example, transmitted by the carrying vehicle and received by the carried vehicle or vice versa. The physical movement may be performed only by the carrying vehicle, only by the carried vehicles and/or by both vehicles. Next, a locking mechanism of at least one flipper secures to a locking receiving mechanism of the carried autonomous vehicle. Next, at least one flipper is lifted. Finally, the carried autonomous vehicle is mounted on top of the carrying autonomous vehicle system using the carried autonomous vehicle lifted position obtained by at least one flipper. Optionally, after the carried autonomous vehicle is mounted, the locking mechanism is released. The locking mechanism release allows loading multiple carried autonomous vehicles by the same flipper. Optionally, the locking, lifting and/or releasing operation performed by the flipper are performed by a plurality of flippers. Optionally, the operations performed by a plurality of flippers are coordinated. For example, the carried autonomous vehicle could fit between two flippers. The robot width of the carried autonomous vehicle is essentially the same as the width between the carrying autonomous vehicle's right and left flippers. A right locking mechanism locks the right side of the carried autonomous vehicle to the right flipper of the carrying autonomous vehicle. A similar locking mechanism locks the carried autonomous vehicle's left side.

Figure 8:
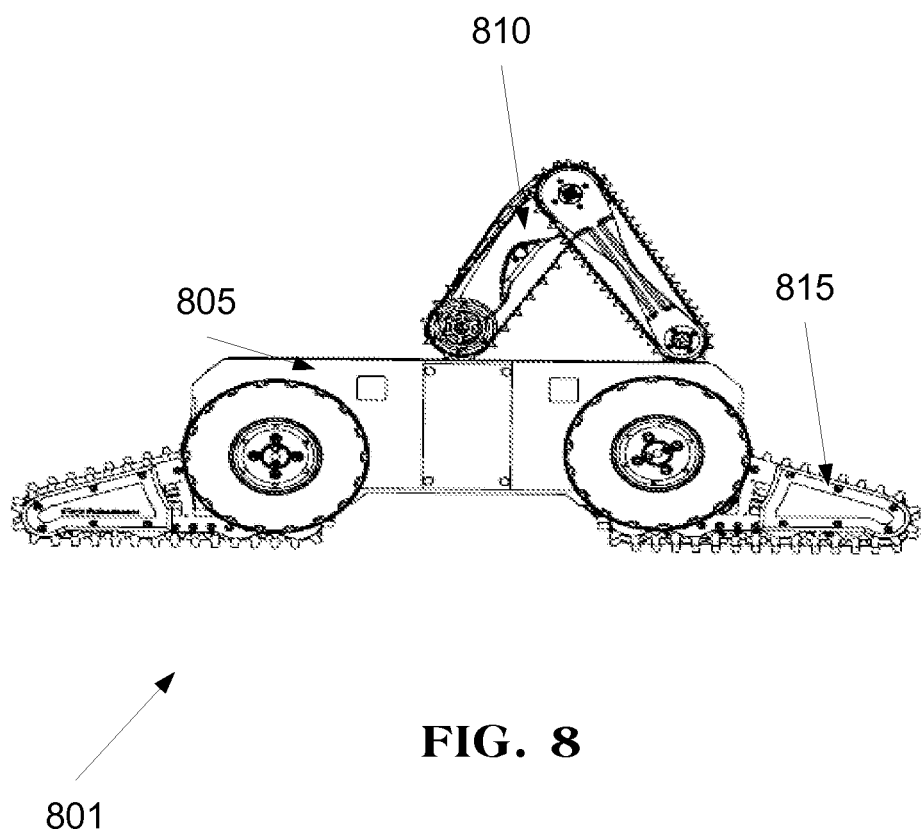
FIG. 8 is a schematic side view illustration of a multi robot system, according to some embodiments of the present invention.

Reference is now made to FIG. 8, which illustrates a schematic side view of a multi robot system 801, according to some embodiment of the present invention. The multi robot system 801 comprises an autonomous vehicle 805 and an autonomous robot 810 having an end effector 820. The autonomous robot 810 has a carried state on top of said autonomous vehicle and an non carried state as an stand alone vehicle unattached to the autonomous vehicle 805. The two states of the autonomous robot 810, a carried and an non carried state, allow dual function as a robotic arm of the and as a stand alone vehicle with and/or without robotic capabilities. A controlling mechanism coordinates the manipulation of an external object by the end effector 820 when the autonomous robot 810 is mounted on the autonomous vehicle 805. Optionally, the autonomous robot 810 has a sensor. The sensor's capability to at least one of gathering and transmitting data is greater in carried state compared to un-carried state. The sensor's physical location while the autonomous robot is in a carried state may allow a higher view point which may increase the range and/or field coverage. Optionally, the autonomous vehicle assumes a protrusion position while in a carried to optimize the sensor's physical location.

Figure 9:
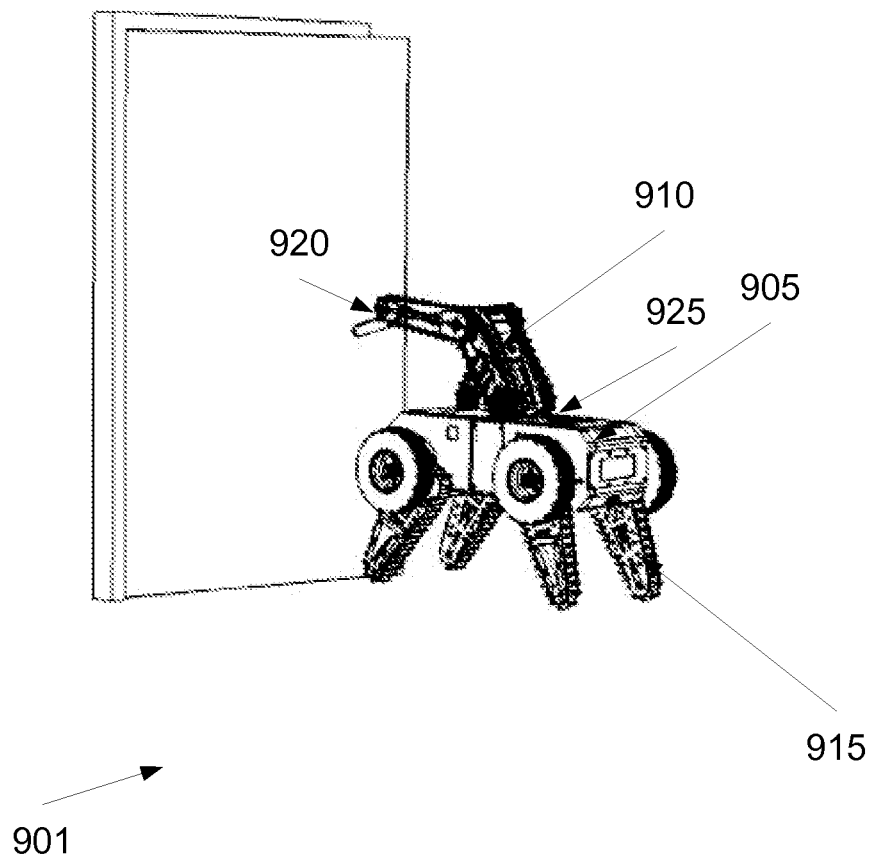
FIG. 9 is a 3D schematic illustration of a multi robot system opening a door, according to some embodiments of the present invention.

Reference is now made to FIG. 9, which is a 3D schematic illustration of a multi robot system 901 opening a door, according to some embodiment of the present invention. The multi robot system 901 is as described in FIG. 8. The multi robot system 901 may function as an elevating platform for the autonomous robot 910. The flippers 915 of the autonomous vehicle 905 are positioned to elevate the top part 925 of the autonomous vehicle 905. The autonomous robot 910 is shown in a carried state. The external object in this example is a door. The end effector 920 is shown while manipulating a door. The autonomous robot 910 may be too short to reach the external object in a non carried state and may be able to reach the same external object in a carried state. Other operations of external object comprise: bomb dismantling, door knob opening and/or turning switches on or off.

Figure 10:
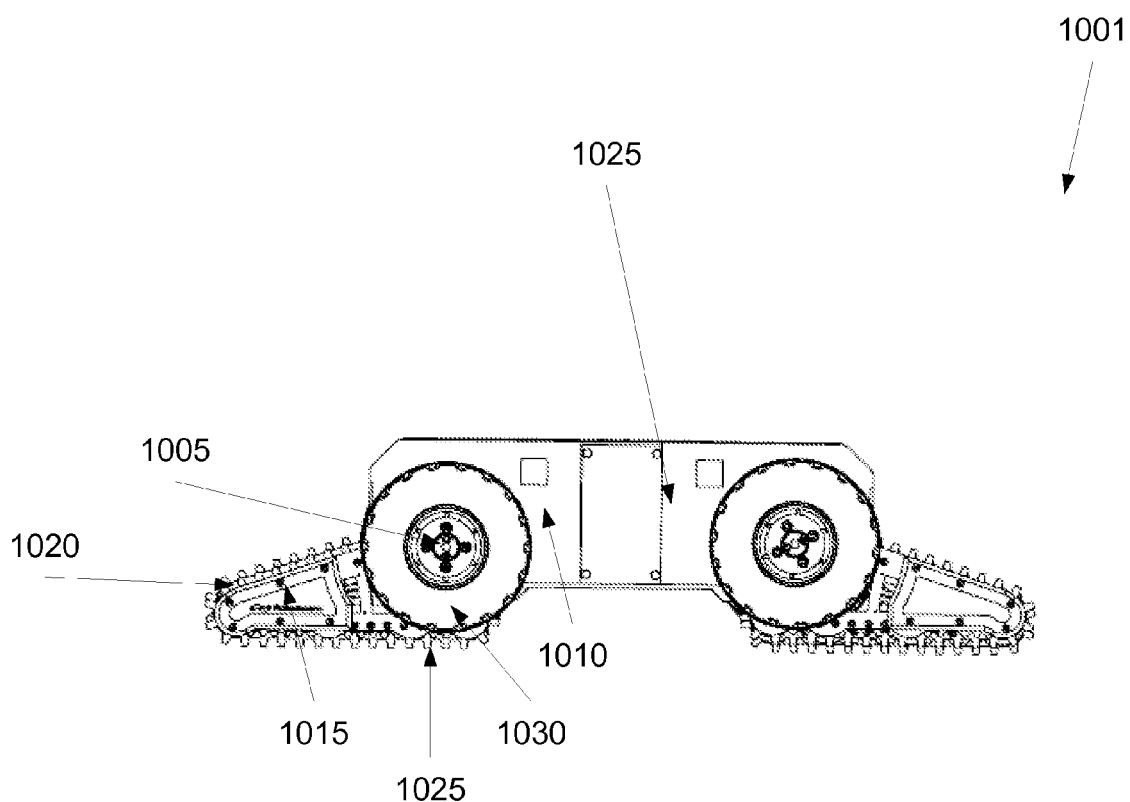
FIG. 10 is a schematic illustration of a vehicle system with two triangular obstacle climbing flippers and two mobilizing wheels on each side, according to some embodiments of the present invention.

Reference is now made to FIG. 10, which is a schematic illustration of a vehicle system 1001 with two triangular obstacle climbing flippers 1015 and two mobilizing wheel 1030 on each side, according to some embodiment of the present invention. The vehicle system 1001 comprises a main frame 1010. A flipper axle 1005 is mounted on the main frame 1010. At least one triangular obstacle climbing flipper 1015 is rotatably connected to the flipper axle 1005. In this example, four obstacle climbing flipper 1015 are mounted on the main frame 1010: right front, left front, right rear and left read. The obstacle climbing flipper 1015 has a moving mechanism 1020. Optionally, the moving mechanism is a continuous track. At least one mobilizing wheel 1030 is mounted on the main frame. The mobilizing wheel 1030 may be an inflatable tire. Optionally, the mobilizing wheel 1030 rotates around the flipper axle 1005. Optionally, the mobilizing wheel 1030 is laterally mounted on the main frame 1010. The distance between the flipper axle 1005 and the obstacle climbing flipper's 1015 bottom side 1025 is greater than the radius of the mobilizing wheel 1030. This distance proportion may cause disconnecting the mobilizing wheel 1030 off the ground upon lowering the obstacle climbing flipper's 1015 so the bottom side 1025 contacts the ground for mobilization. Optionally, the vehicle system 1001 further comprises a powering element. The powering element powers at least one triangular obstacle climbing flipper 1015 and at least one mobilizing wheel 1030. Optionally, the vehicle system 1001 further comprises a reversible locking mechanism. The reversible locking mechanism releases at least one mobilizing wheel 1030. The released mobilizing wheel 1030 may be remounted on the main frame 1010 by the reversible locking mechanism. The locking mechanism may be as described in FIG. 1.

Figure 11:
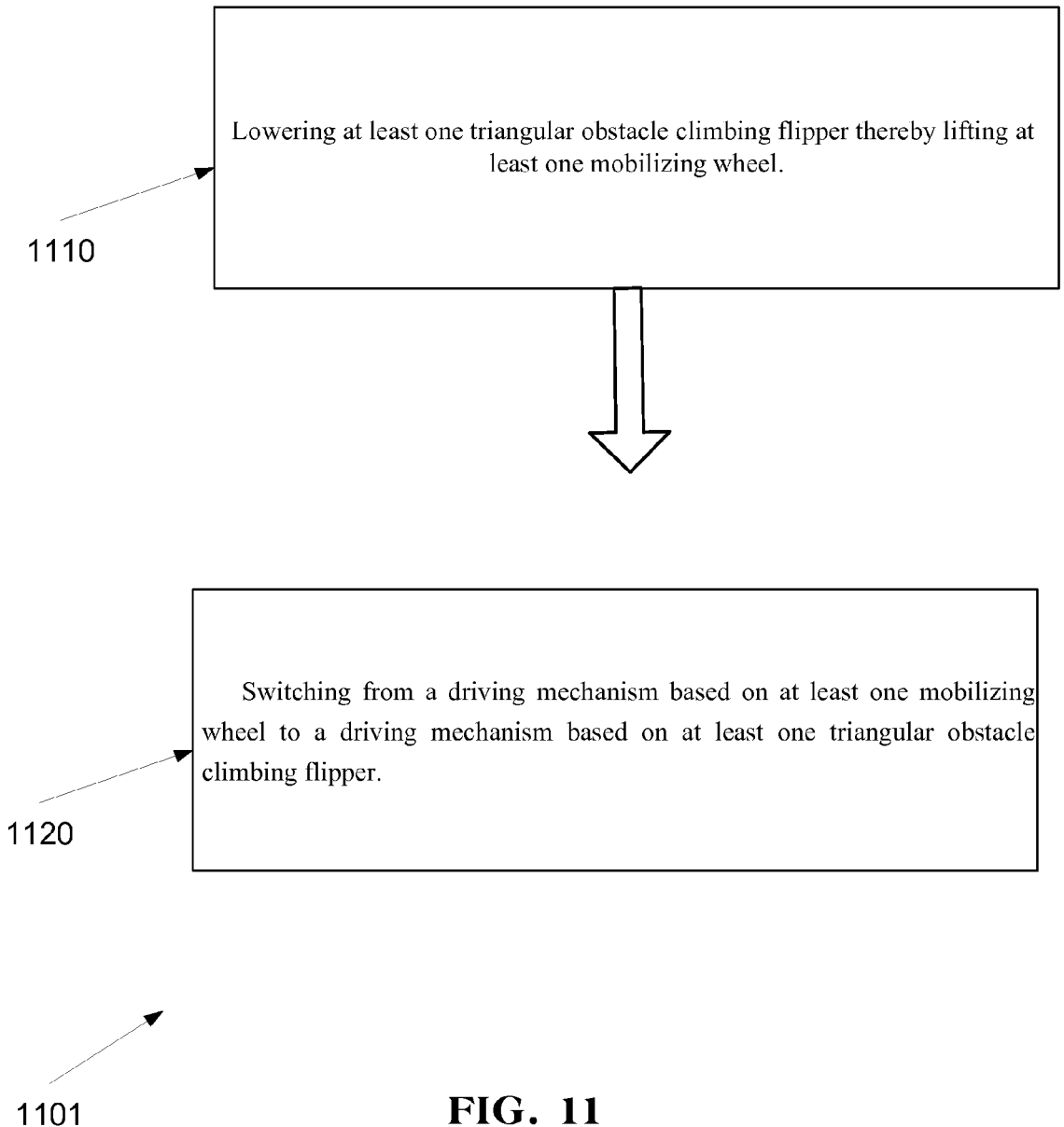
FIG. 11 is a schematic illustration of a process for switching between flipper based and driving wheel based driving mechanisms, according to some embodiments of the present invention.

Reference is now made to FIG. 11, which is a schematic illustration of the process for switching between flipper based and driving wheel based driving mechanisms, according to some embodiment of the present invention. First, at least one triangular obstacle climbing flipper is lowered, thereby lifting at least one mobilizing wheel. Next, the driving mechanism is switched from a driving mechanism based on at least one mobilizing wheel to a driving mechanism based on at least one triangular obstacle climbing flipper. Driving mechanism switching may be achieved by the dimensions and positioning of a flipper and a mobilizing wheel. For example, the distance between a flipper axle and an obstacle climbing flipper's bottom side is greater than the radius of a mobilizing wheel as described in FIG. 10. Optionally, the driving wheels are release from the vehicle system. Releasing the driving wheels may contribute to reducing the overall dimensions of the vehicle system and/or its weight.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

It is expected that during the life of a patent maturing from this application many relevant driving mechanisms, sensors and/end effectors will be developed and the scope of the terms driving mechanisms, sensors and/end effectors are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A carrying autonomous vehicle system, comprising:
a carrying autonomous vehicle having a main frame a plurality of flippers having continuous tracks and connected to opposite sides of said main frame; and
at least one carried autonomous vehicle;
wherein said at least one carried autonomous vehicle uses said plurality of flippers to mobilize said carrying autonomous vehicle using said continuous tracks and at least one of load and unload said at least one carried autonomous vehicle on said main frame.

2. The system of claim 1, wherein said main frame has an essentially flat top part.

3. The system of claim 1, wherein said at least one carried autonomous vehicle comprises a plurality of carried autonomous vehicles and the total accumulated area of said plurality of carried autonomous vehicles is essentially the same as the area of said main frame.

4. The system of claim 1, wherein said carrying autonomous vehicle coordinates said at least one carried autonomous vehicle use of said plurality of flippers to at least one of load and unload said at least one carried autonomous vehicle on said main frame.

5. The system of claim 1, wherein movement range and position of said plurality of flippers allow said main frame to be angled towards said at least one carried autonomous vehicle thereby allowing said plurality of flippers to at least one of load and unload.

6. The system of claim 1, wherein said at least one carried autonomous vehicle has a pair of carried flippers and said plurality of flippers comprises a pair of flippers and the distance between said pair of flippers is essentially the same as the distance between said pair of carried flippers.

7. The system of claim 1, further comprising:
a locking mechanism mounted on said plurality of flipper; and
a locking receiving mechanism on at least one carried autonomous vehicle; wherein said locking mechanism locks into said locking receiving mechanism thereby allowing attachment of at least one carried autonomous vehicle to said plurality of flippers.

8. A method for loading a carrying autonomous vehicle system, carrying an autonomous vehicle, comprising:
navigating a carried autonomous vehicle to a proximity of a carrying autonomous vehicle, wherein said carried autonomous vehicle is mobilized using continuous tracks of a plurality of flippers connected to opposite sides of said carried autonomous vehicle;
instructing the maneuvering of said plurality of flippers of said carrying autonomous vehicle to a loading angle; and
navigating said carried autonomous vehicle to climb said carrying autonomous vehicle in said loading angle by climbing on said plurality of flippers.

9. The method of claim 8, further comprising:
positioning said carried autonomous vehicle and said carrying autonomous vehicle so said carried autonomous vehicle's pair of carried flippers is essentially in front of said carrying autonomous vehicle system's pair of flippers; and
driving said pair of carried flippers on top of said pair of flippers.

10. A method for loading a carried autonomous vehicle on a carrying autonomous vehicle system comprising:
instructing a carried autonomous vehicle and a carrying autonomous vehicle system having a plurality of flippers to a close proximity, said plurality of flippers having continuous tracks adapted to mobilize said carrying autonomous vehicle;
securing a locking mechanism of said plurality of flippers to a locking receiving mechanism of said carried autonomous vehicle;
lifting said plurality of flippers; and
mounting said carried autonomous vehicle on top of said carrying autonomous vehicle system using said carried autonomous vehicle lifted position obtained by said plurality of flippers.

11. The method of claim 10, further comprising releasing said locking mechanism thereby allowing loading multiple said carried autonomous vehicles by the same said plurality of flippers.

* * * * *